Sept. 14, 1926.

L. S. GRIGG

SINK STRAINER

Filed Feb. 3, 1926

Inventor

L. S. Grigg.

By Lacey & Lacey, Attorneys

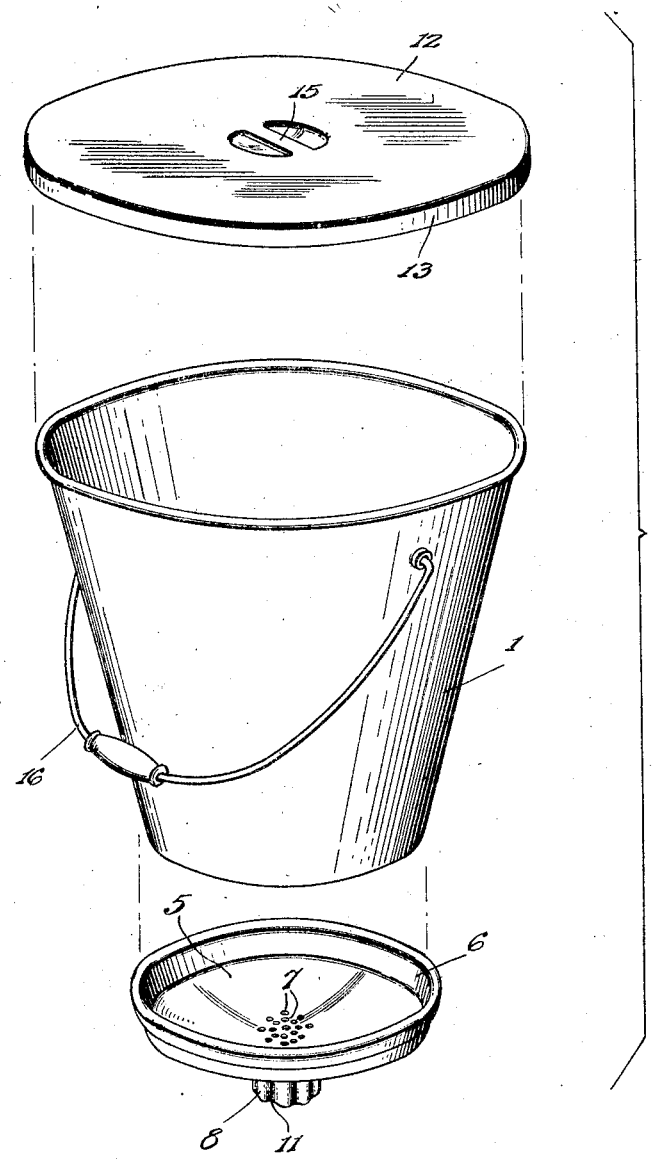

Patented Sept. 14, 1926.

1,599,887

UNITED STATES PATENT OFFICE.

LILLY S. GRIGG, OF LONG BEACH, CALIFORNIA.

SINK STRAINER.

Application filed February 3, 1926. Serial No. 85,746.

This invention relates to a strainer and more particularly to a strainer adapted for use in connection with a kitchen sink.

One object of the invention is to so construct the strainer that it may be set in the sink, after the perforated guard plate usually provided for the outlet of the sink has been removed, with an outlet neck of the strainer extending downwardly into the outlet of the sink so that any liquid poured into the hopper or receptacle of the strainer will pass directly into the outlet pipe of the sink without contacting with the enamel surface of the bottom or sides of the sink. Therefore, if coffee grounds, tea leaves or other substances which would be liable to discolor the enamel surface of the sink are emptied into the strainer, the water draining from them will be prevented from flowing over the enamel surface and discoloring it and in addition the material placed in the strainer may be permitted to drain practically dry before being emptied from the strainer into a garbage pail.

Another object of the invention is to so construct the strainer that the hopper or receptacle thereof may be removably seated upon the base, the outlet neck of which fits into the discharge pipe or neck of the sink and the receptacle prevented from accidentally moving out of its proper seated relation to the base.

Another object of the invention is to so construct the receptacle or hopper of the strainer that its bottom which is perforated may be supported in spaced relation to the base upon which the receptacle rests and thereby provide a clearance so that the material in the receptacle may drain in a very effective manner and the accumulation of water beneath the strainer which occurs when a strainer rests directly upon the bottom of a sink prevented.

Another object of the invention is to so form the strainer that it may be readily cleaned by pouring hot water through it and further so constructed that the receptacle and base may be readily separated so that the under face of the receptacle bottotm and upper face of the base may be thoroughly cleaned.

Another object of the invention is to provide a strainer having a lid or cover for the receptacle, the upper face of which will be flat so that pans may be supported upon the strainer if it is desired to have the contents of the pan cooled before being emptied or removed from the pan.

This invention is illustrated in the accompanying drawing, wherein—

Fig. 4 is a perspective view of the strainer with the elements forming the same separated.

Figure 2:
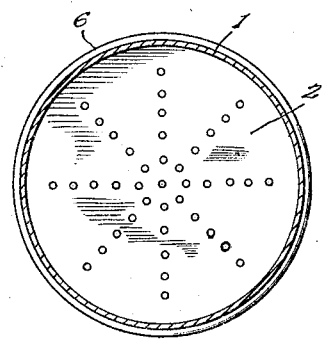
Fig. 2 is a transverse sectional view taken on the line 2—2 of Fig. 1.
Figure 3:
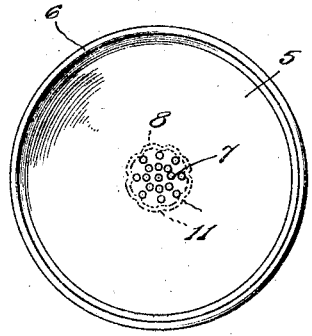
Fig. 3 is a top plan view of the base of the strainer.

The receptacle or hopper 1 of the strainer is formed of metal which may be aluminum if desired or a cheaper metal suitably coated with enamel or the like so that it will be attractive in appearance and readily kept clean and prevented from becoming rusted. The receptacle tapers downwardly towards its bottom 2 which is perforated, as shown in Fig. 2, and joined to the bottom of the receptacle by a depending folded joint forming annular flange 3 which serves to prevent contact of the perforated bottom with the base upon which the receptacle rests. It will, therefore, be seen that when material is placed in the strainer the perforated bottom will be prevented from having contact with the base or the bottom 4 of a sink if, for any reason, the receptacle should be used independent of its base and the material placed in the receptacle permitted to thoroughly drain without a portion of the liquid drained from the contents of the strainer remaining beneath the bottom of the receptacle and preventing thorough draining of the contents.

The base 5 for the receptacle 1 is of a concavo-convex formation and at its periphery is provided with an upstanding wall 6 to engage the base flange 3 of the receptacle and prevent the receptacle from having movement transversely of the base when set thereon. It should be further noted that, since the wall 6 flares upwardly and at its junction with the base is of a diameter corresponding to the diameter of the flange 3 at its lower edge, the wall will serve very effectively to guide the receptacle into proper seated relation to the base. By having the base of a concavo-convex formation as shown in Fig.

1, water passing from the receptacle onto the base will flow towards the central portion of the base and pass outwardly through the perforations 7 formed therein and will not tend to accumulate in the base. These openings 7 are not liable to become clogged as tea leaves and other substances which would be liable to close them will be retained in the receptacle as they cannot pass through the drain openings formed in the bottom of the receptacle. A depending neck 8 extends about the perforated central portion of the base 5 and is of a diameter to permit of its being readily inserted into the outlet neck 9 of the sink 4 when the cover plate which ordinarily is secured in the seat 10 about the upper end of the outlet neck 9 is removed.

Figure 1:
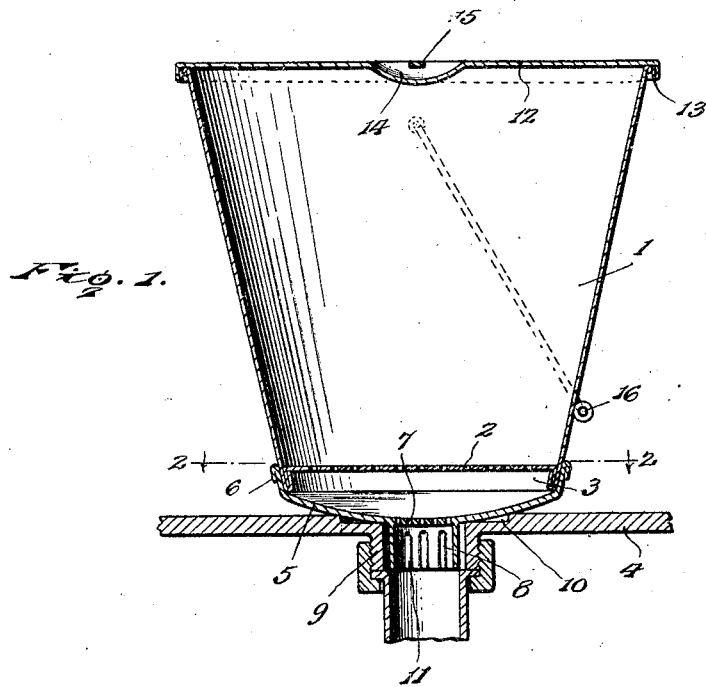
Figure 1 is a vertical sectional view through the improved strainer and a fragment of the sink with the discharge neck of the strainer base fitting into the outlet of the sink.

By an inspection of Fig. 1, it will be readily seen that when the strainer is in use the usual cover for the outlet of the sink is removed and the base set in place with the discharge neck 8 extending into the outlet 9. The neck 8 is crimped, as shown at 11, about its circumference and, therefore, if the neck does not fit freely into the outlet neck 9 of the sink, it can be readily forced into place and will have frictional engagement with the walls of the neck 9 and be firmly held in place. The under face of the base rests upon the bottom of the sink and, therefore, the base will be prevented from having tilting movement. The receptacle rests upon the base and has its bottom spaced well above the base so that water passing through the drain openings in the bottom may readily pass through the openings 7 into the discharge spout 8. By using this strainer tea leaves, coffee grounds, refuse from vegetables or meat prepared for cooking or scraped from dishes after a meal may be thoroughly drained before being emptied into a garbage pail without the sink becoming stained as the liquid drained from the material in the receptacle flows directly into the outlet 9 without flowing along the surface of the sink. It should also be noted that after fish, onions, meat or the like have been boiled, greasy or discolored water may be poured out of the utensil in which they have been cooked into the receptacle 1 and flow into the outlet of the sink without causing the sides or bottom of the sink to be discolored or coated with a film of grease. Therefore, the sink will be kept clean and a cloth used to wipe the sink will not be soiled. The cover 12 provided for the open upper end of the receptacle rests flat upon the upper edge thereof and is provided with a depending annular flange 13 which fits about the upper portion of the receptacle and prevents the cover from slipping out of place. This cover has a flat upper face and, therefore, forms a very good support upon which may be placed a pie pan or other cooking utensil so that the contents thereof may cool. By having the cover provided with a strong depending flange or rim, it may be placed upon a table or sink and support a hot pan so that the surface of the table or sink will not be damaged by the heat of the pan. A depression 14 is formed adjacent the center of the cover or lid 12 and is bridged by a strip 15 which forms a hand-hold 15 to be grasped when it is desired to remove the cover. A handle 16 is provided so that the receptacle can be readily lifted when it is necessary to empty the contents thereof into a garbage pail.

Having thus described the invention, I claim:—

A sink strainer comprising a concaved base having its lowest portion perforated and a depending neck enclosing said perforated portion and adapted to fit into the outlet of a sink, an upstanding peripheral wall for said base, a receptacle removably resting upon said base and held against transverse movement thereon by said wall, and a perforated bottom for said receptacle spaced above the lower end thereof to provide a clearance between said base and the bottom of said receptacle.

In testimony whereof I affix my signature.

LILLY S. GRIGG. [L. S.]